May 16, 1967 M. R. CLELAND 3,320,513

VOLTAGE MULTIPLICATION APPARATUS

Filed April 2, 1964 2 Sheets-Sheet 1

Marshall R. Cleland,
Inventor.

Koenig, Senniger, Powers and Leavitt,
Attorneys.

May 16, 1967 M. R. CLELAND 3,320,513

VOLTAGE MULTIPLICATION APPARATUS

Filed April 2, 1964

2 Sheets-Sheet 2

United States Patent Office 3,320,513
Patented May 16, 1967

3,320,513
VOLTAGE MULTIPLICATION APPARATUS
Marshall R. Cleland, Huntington Station, N.Y., assignor to Radiation Dynamics, Inc., Westbury, N.Y., a corporation of New York
Filed Apr. 2, 1964, Ser. No. 356,852
1 Claim. (Cl. 321—15)

Figure 1:
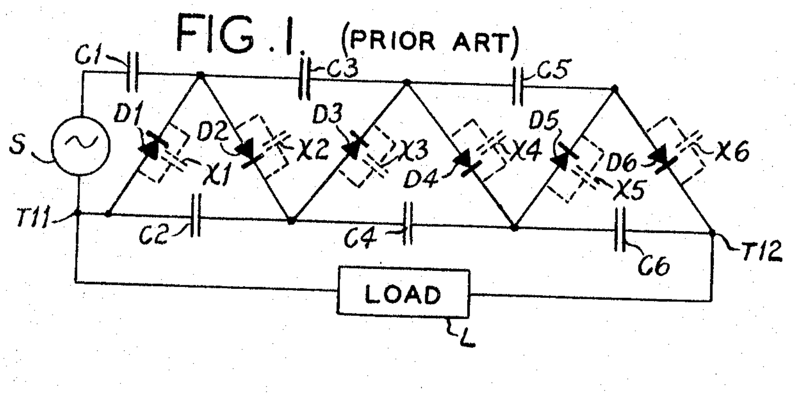
FIG. 1. (PRIOR ART)

This invention relates to voltage multiplication apparatus, and more particularly to voltage multiplication apparatus which provides a high voltage D.C. output potential.

Among the several objects of this invention may be noted the provision of voltage multiplication apparatus which operates with increased efficiency to convert relatively low voltage A.C. power, for example, 10 kv. A.C. power, to a high voltage D.C. output potential, for example, on the order of 500 kv. to 6 mv.; the provision of such apparatus which advantageously employs metallic rectifying diodes, such as selenium or silicon diodes, in place of vacuum tube or gas diodes and the like, and which performs well at relatively high frequencies, for example, in the range between 50 and 300 kc.; the provision of apparatus of the class described which produces a D.C. output potential having reduced ripple voltage across a relatively high impedance load; and the provision of voltage multiplication apparatus which is relatively inexpensive and highly efficient and reliable in operation. Other objects and features will be in part apparent and in part pointed out hereinafter.

In fabricating voltage multiplication apparatus of the type which employs a number of cascaded or series-connected rectifier units energized or driven by a single relatively low voltage A.C. power source, it is advantageous to use metallic rectifiers. Metallic rectifiers typically comprise one or more discs of metal under pressure with semiconductor coatings or layers. The term as used herein is intended to be generic to or synonymous with junction-type rectifiers such as selenium or copper-oxide rectifiers and solid-state or transistor rectifiers, for example, silicon rectifiers. The term metallic rectifiers as used herein is also generic to barrier layer, barrier level or barrier film rectifiers and to semiconductor, solid electrolytic, or dry-type rectifiers. Particularly in applications where efficiency and reliability are prime considerations, metallic rectifiers possess marked advantages over other types of rectifiers, such as vacuum tubes or gas diodes. For one thing, they generally have a lower forward impedance than an equivalent vacuum tube rectifier, and therefore produce a lower forward D.C. voltage drop. Additionally, such rectifiers require no costly or elaborate filament supply with the attendant problem of insulation. The lower operating temperature of solid-state rectifiers, for example, silicon diodes, plus their inherent reliability and long life allows their use in sealed enclosures or generally inaccessible locations. Moreover, unlike tube type rectifiers, solid-state rectifiers, made for example of silicon, can be formed into almost any shape and to almost any degree of ruggedness to comply with rigorous standards or specifications. Added to this is the fact that the art is developing in the direction of metallic rectifiers so that units which are designed to employ present day rectifiers of this type may be readily adapted to new and improved rectifying devices as they become available.

However, an inherent characteristic of the metallic rectifier, its relatively high interelectrode capacitance, has greatly curtailed the use of such units in conventional or prior art voltage multiplication apparatus. If employed in a conventional "Cockcroft-Walton" or "Greinacher" circuit, for example, in which a relatively high frequency A.C. source is used to drive the various rectifying units, this high interelectrode capacitance would greatly lower the reverse impedance across each diode or rectifier and would cause A.C. current to be coupled through the chain of cascaded or series-connected rectifiers to the high voltage D.C. output terminals of the apparatus. I have found that when the reverse impedance of the rectifying units at the operating frequency of the A.C. source is not substantially greater than the load impedance connected across the output terminals of the apparatus (for example, when the reverse impedance of the rectifiers is not more than about six to ten times the load impedance) this undesirable A.C. potential developed across the load becomes a significant portion of the output potential. In one application wherein selenium rectifiers were employed in a slightly modified Cocktroft-Walton or Greinacher circuit, for example, and wherein the reverse impedance of the rectifying units at the A.C. operating frequency was approximately one sixth that of the load impedance, I found that the potential developed across the load was mostly A.C., and that no significant D.C. potential was developed. The present invention is directed to novel voltage multiplication apparatus of the class described which employs metallic or junction-type rectifiers, which is highly efficient, and wherein there is little or no undesirable A.C. potential developed across a high impedance load.

Essentially, the voltage multiplication apparatus of this invention comprises a plurality of rectifying modules each having positive and negative D.C. output terminals and a plurality of A.C. input terminals. The output terminals of the modules are connected in series between a pair of high voltage D.C. output terminals across which is connected a load impedance. An A.C. power source is provided, along with a plurality of capacitors interconnected between the A.C. input terminals of the modules for coupling A.C. from this source to each of the modules. Each of the latter comprises a plurality of metallic or junction-type rectifying diodes which have a reverse impedance at the operating frequency of the A.C. source not substantially greater than the impedance of the load. The diodes of each module are interconnected to form a balanced rectifying circuit wherein current coupled across any one of the diodes in a reverse direction at any instant is compensated for by current coupled across another diode of the module in a forward direction. The result is that each of the rectifying modules converts the A.C. coupled thereto to a D.C. potential across its respective positive and negative terminals. Since there is no A.C. developed across each module, there is no A.C. potential component or portion developed across the high impedance load connected at the output terminals of the apparatus. In a preferred form of the invention, each of the modules includes an inductor to further enhance the efficiency of the apparatus.

The invention accordingly comprises the constructions and circuits hereinafter described, the scope of the invention being indicated in the following claim.

Figure 2:
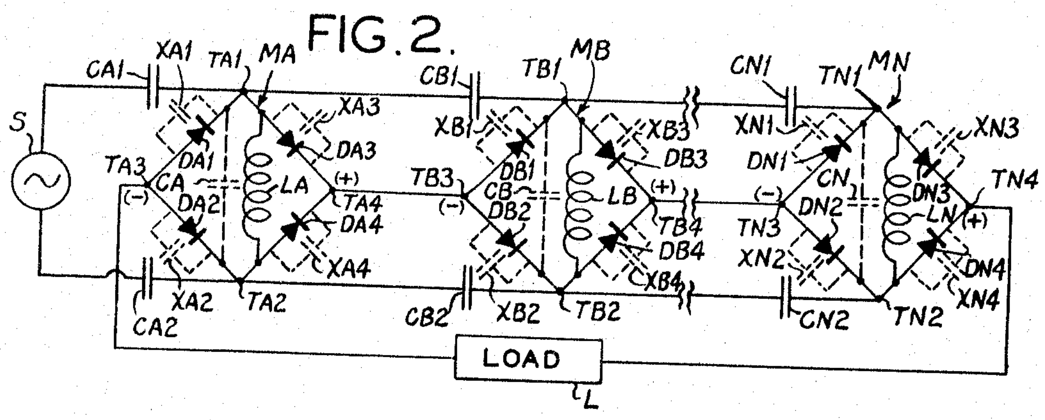
Figure 3:
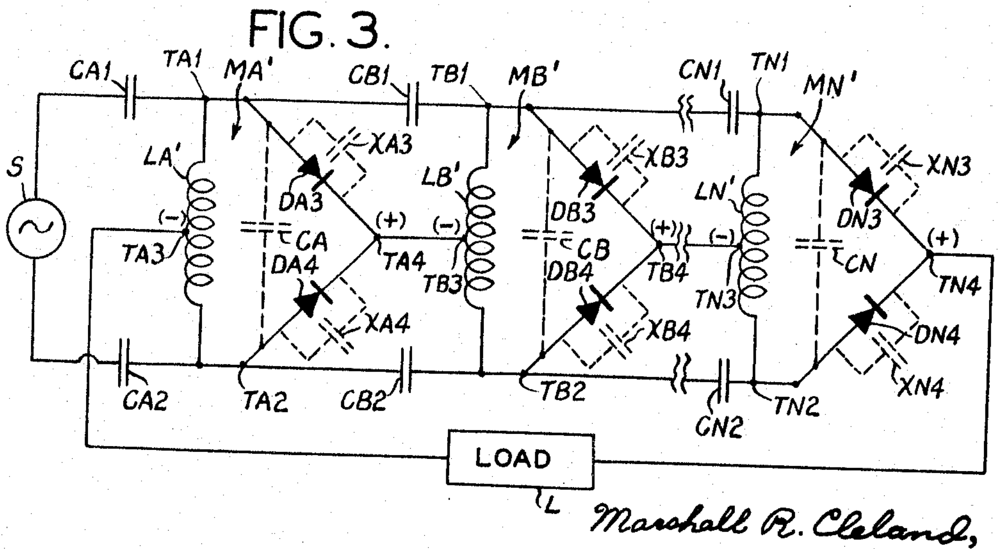
Figure 4:
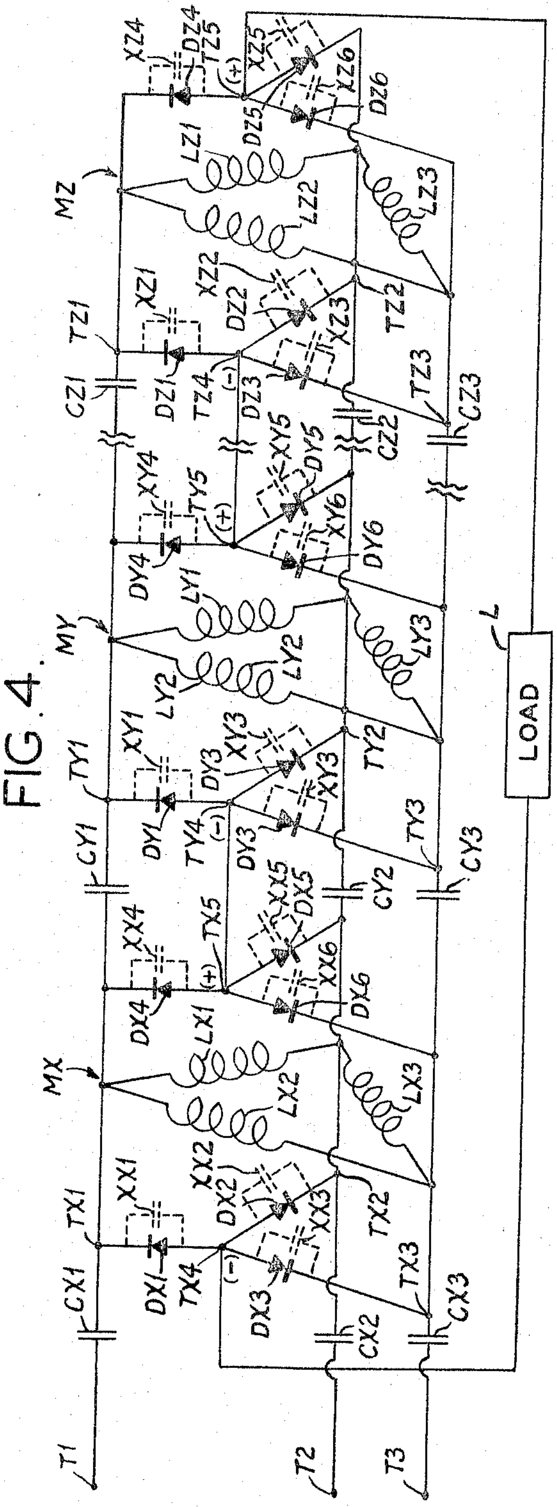

In the accompanying drawings, in which several of various possible embodiments of the invention are illustrated, FIG. 1 is a circuit diagram illustrating a typical prior art voltage multiplier circuit; and FIGS. 2–4 are circuit diagrams illustrating the electrical components of three preferred embodiments of this invention and their interconnection.

Corresponding reference characters indicate corresponding parts throughout the drawings.

Referring now to the drawings, and more particularly to FIG. 1, a typical six-stage Cockcroft-Walton or Greinacher voltage multiplying circuit is illustrated as comprising a plurality of rectifying units or diodes D1–D6 connected in series between a pair of high voltage D.C.

output terminals T11 and T12, and a plurality of coupling capacitors C1–C6. The latter supply or couple A.C. power from a relatively low voltage (e.g. 10,000 volts) A.C. source (indicated at S) to each of the diodes. The interelectrode or barrier capacitance of each diode is indicated at X1–X6. Each diode serves to rectify the A.C. potential coupled thereto, theoretically at least to provide a D.C. output potential. Because the diodes are connected in series, the sum of the individual D.C. output potentials of the rectifying units is developed at output terminals T11 and T12 and applied across a load device L. This load may consist of an accelerator tube, for example, or other similar high-voltage D.C. apparatus which may be purely resistive or may be suitably bypassed with its own filter capacitor.

While the circuit of FIG. 1 would appear to operate or function as intended under certain conditions (for example when vacuum tube or gas diodes are employed or when the operating frequency of the A.C. source is relatively low) I have found, as noted above, that when metallic or junction-type diodes are used in the FIG. 1 circuit to supply high voltage to a relatively high impedance load, a serious problem arises: a significant portion of the potential developed across this load is A.C. This is due, for the most part, to the high interelectrode capacitance (X1–X6) of junction-type or metallic rectifiers which, at relatively high A.C. operating frequencies, permits A.C. to be coupled through the cascaded rectifiers to the load. Stated somewhat differently, because of the high interelectrode capacitance of this type of rectifier, each module produces a potential at its output terminal which includes a substantial A.C. component. Because of the series connection of the modules, these A.C. components add up to provide a relatively high A.C. potential across the load. In one specific application of the FIG. 1 circuit, for example, which employed selenium rectifiers having a reverse impedance at the operating frequency of the A.C. source approximately one-sixth that of the load impedance, little or no D.C. potential was detectable across output terminals T1 and T2; and for all practical purposes the circuit was inoperative.

It should be noted that in a circuit such as that of FIG. 1, the higher the operating frequency, the more compact and economical can be the capacitors, and losses can be reduced with an attendant increase in efficiency and economy. However, with selenium rectifiers, for example, at frequencies above about 10 kc., the reverse impedance of the diodes becomes so low relative to that of typical high impedance loads that the efficiency of conversion drops below economically practical levels and the losses become unacceptable.

In accordance with the present invention, voltage multiplication apparatus is provided in which junction-type or metallic rectifiers are employed to convert relatively low voltage, high frequency A.C. to a high voltage D.C. output potential across a relatively high impedance load, and wherein there is little or no A.C. potential developed across this load.

Referring now to FIG. 2, a first embodiment of this invention is illustrated as comprising a plurality of rectifying modules MA, MB and MN each having a pair of input terminals TA1, TA2; TB1, TB2; and TN1, TN2, respectively, and positive and negative output terminals TA3, TA4; TB3, TB4; and TN3, TN4. While only three modules are shown in FIG. 2, it should be understood that any number of modules may be employed in any specific application to provide the preselected or desired voltage multiplication. Each module includes four metallic or junction-type diodes (for example selenium or silicon diodes) indicated at DA1–DA4; DB1–DB4; and DN1–DN4 interconnected to form a balanced bridge circuit. The interelectrode or barrier capacitances of these diodes are indicated at XA1–XA4; XB1–XB4 and XN1–XN4. Two coupling capacitors for each module are provided to couple A.C. power from a single-phase A.C. source S to the A.C. input terminals of each module. Thus capacitors CA1, CA2 are interconnected between source S and the first module MA; capacitors CB1, CB2, between modules MA and MB; and capacitors CN1 and CN2 are interconnected between the second to the last module in the chain and the last module MN. The D.C. output terminals of the modules are connected in series or cascade between terminals TA3 and TN4, which constitute the high voltage output terminals of the apparatus, and a load impedance L is connected across these high voltage output terminals.

The total or overall interelectrode capacitances of the individual modules, present between the respective A.C. input terminals thereof, are indicated at CA, CB and CN. It will be assumed for purposes of explanation that these capacitances include not only the capacitance between the A.C. input terminals resulting from the various interelectrode capacitances XA1–XA4, etc., but also from other stray or inherent capacitances in each module caused by special shielding rings, etc. In any specific application or embodiment, the size of capacitance CA, CB, CN may be established or determined empirically in any well-known manner. The capacitance of coupling capacitors CA1, CA2, CB1, CB2, CN1 and CN2 is large relative to the interelectrode capacitance of the metallic rectifying diodes so that the impedance of coupling capacitor CA1 etc. is substantially less than (e.g., 1/5 to 1/10 of) the impedance of the interelectrode capacitance of diode DA1 etc., at the operating frequency of source S. To maximize the A.C. impedance of each module and thereby enhance the efficiency of the FIG. 2 apparatus, an inductor is connected between the A.C. input terminals of each module, in shunt with these capacitances. Thus an inductor LA is connected in parallel with capacitance CA; an inductor LB, in shunt with capacitance CB; and an inductor LN is connected in parallel with capacitance CN. The parameters of inductors LA, LB and LN are determined by the size of the respective capacitance CA, CB and CN and the operating frequency of source S; these inductors are chosen so as to form parallel LC tank circuits with their respective capacitance which are resonant at or tuned to the frequency of source S.

Operation of the FIG. 2 apparatus is as follows: The A.C. source S supplies low-voltage, high-frequency A.C. power, for example, 10 kv., at a frequency on the order of 50–300 kc. For selenium rectifiers, for example, the operating frequency may be in a range from 50 to 100 k.c. For silicon, the operating frequency may be as high as 300 kc.) This A.C. power is coupled to the A.C. input terminals of each rectifying module by capacitors CA1, CA2; CB1, CB2; and so on. Each module serves to rectify the A.C. power coupled thereto and produce a D.C. voltage across its respective output terminals. Because the D.C. output terminals of the respective modules are connected in series, the respective D.C. output potentials are summed and applied to or developed across load device L. The potential developed across this load is therefore an extremely high D.C. voltage, the level of which being a function of the voltage supplied by source S and the number of series connected modules. Typically, this D.C. potential may be on the order of 500 kv. to 6 mv.

The inherent interelectrode capacitance of the junction-type diodes causes the reverse impedance of these diodes at the operating frequency of source S to be not substantially greater than the impedance of load L. It will be noted that under these conditions the prior art apparatus illustrated in FIG. 1 was found to be inoperative for all practical purposes. This is not the case with the FIG. 2 apparatus. Because the diodes of each module are interconnected to form a balanced rectifying circuit, current coupled across any one of the diodes in a reverse direction at any instant is compensated for by current coupled across another diode of the module in a forward direction. Considering module MA, for example, during the half cycle that terminal TA1 is positive with respect to terminal TA2, diode DA3 conducts, coupling a positive pulse or half-sine wave to terminal TA4. During this time period a negative half-sine wave or pulse is also conducted or coupled through the interelectrode capacitance XA4 of diode DA4 (i.e., in a reverse direction through diode DA4); however this negative half-sine wave is bucked out or substantially nullified by a positive pulse or half-sine wave coupled through the interelectrode capacitance XA3 (i.e. through diode DA3 in a forward direction). This compensation not only assures that the potential at terminal TA4 remains positive with respect to terminal TA3, but also enhances the efficiency of rectification in the module.

Conversely, during the half cycle that input terminal TA2 is positive with respect to terminal TA1, a positive pulse coupled across the interelectrode capacitance XA4 of diode DA4 in effect bucks out or substantially nullifies the negative pulse coupled through interelectrode capacitance XA3 of diode DA3 (i.e. coupled in a reverse direction through diode DA3). Accordingly, terminal TA4 of module MA remains positive with respect to terminal TA3. Similar considerations apply to each of the remaining modules. In view of this it is seen that each module produces a unidirectional potential across its output terminals, and as a result a unidirectional or substantially pure D.C. potential is developed across load device L.

Because of inductors LA, LB and LN, each of the modules is tuned to the frequency of source S. Thus module MA exhibits the A.C. impedance characteristics of a parallel tuned circuit connected across terminals TA1, TA2; module MB has the characteristics of such a circuit connected across terminals TB1, TB2, and so on. This maximizes the A.C. impedance of each module, thereby reducing the current through coupling capacitors CA1, CA2, CB1, CB2, etc. This, in turn, enhances the efficiency of the apparatus by minimizing losses in these coupling capacitors. Moreover, this inductive tuning permits a reduction by a factor of 10 in the size of the coupling capacitors. The capacitance in each module provides a filtering or smoothing action and thereby reduces the ripple voltage of the potential developed across the load. Furthermore, inasmuch as the impedance of the coupling capacitors CA1 etc. is small in comparison to the reverse impedance of the rectifying diodes DA1 etc., the parallel tuned LC resonant circuit of each of the modules MA, MB and MN is not significantly effected by these coupling capacitors, i.e., they do not constitute a part of these resonant circuits which have their resonating currents respectively substantially in phase.

In summary, then, the FIG. 2 apparatus operates with increased efficiency to convert relatively low-voltage, high-frequency A.C. power to a very high-voltage D.C. potential across a D.C. load device. This apparatus employs metallic or junction-type rectifiers, for example, selenium or silicon rectifiers, and therefore possesses marked advantages over prior art apparatus wherein vacuum tube or gas diodes are used. Moreover, because virtually no limitations are imposed with respect to the frequency of the A.C. source or the load impedance with which the apparatus may be used, the range of application of the apparatus is considerably extended.

A second embodiment of this invention is illustrated in FIG. 3. This embodiment is similar for the most part to the FIG. 2 apparatus, and corresponding components or elements are indicated by like reference characters. In FIG. 3, instead of employing four metallic diodes in each rectifying module, only two are used, in combination with a center-tapped inductor. Module MA′, for example, comprises diodes DA3 and DA4, the anodes of which are connected to opposite ends of a center-tapped inductor LA′. The A.C. input terminals of module MA′ are indicated at TA1 and TA2, while the D.C. output terminals thereof are constituted by the center tap of inductor LA′ (indicated at TA3) and the common connection between diodes DA3 and DA4 (indicated at TA4). In addition to providing a means of connecting the modules in series across high voltage output terminals TA3 and TN4, inductors LA′, LB′ and LN′ form parallel circuits (tuned to the frequency of source S) with respective capacitances CA, CB and CN, thereby maximizing the A.C. input impedance of each module and increasing the efficiency of operation as explained above. The capacitance of CA1, etc., is maintained in the same parametrical relationship with the interelectrode capacitance XA1 etc. as above described, i.e., it will be large relative to XA1 so that the impedance of CA1 is much smaller than that of XA1 at the high operation frequencies of source S.

Operation of the voltage multiplication apparatus of the FIG. 3 embodiments is essentially the same as that outlined above in connection with FIG. 2. The relatively low voltage A.C. supplied by source S is coupled by capacitor CA1, CA2, etc. to the A.C. input terminals of each module where it is rectified or converted to a unidirectional or D.C. potential across the respective output terminals of the module. Again, because the modules are connected in series, these respective D.C. output potentials are summed and applied to or developed across load device L. Because the diodes of each module are interconnected to form a balanced circuit, current coupled across one of the diodes in a reverse direction at any instant is compensated for or bucked out by current coupled across the other diode of the module in a forward direction. Accordingly, no undesirable A.C. is developed across the load device L even though the reverse impedance at the operating frequency of source S is not substantially greater than the load impedance; for example, when this reverse impedance is not more than ten times the load impedance. Again because of inductors LA′, LB′ and LN′, each module exhibits the A.C. impedance characteristics of a parallel tuned circuit. As explained above, this increases the overall efficiency of operation by reducing the current through coupling capacitors CA1, CA2, CB1, CB2, etc., and permits a substantial reduction in the size of these capacitors.

The FIG. 3 apparatus possesses the substantial advantages noted above in connection with FIG. 2. Additionally, since the FIG. 3 apparatus employs a reduced number of components, it is less expensive and more reliable in operation.

A third embodiment of this invention, illustrated in FIG. 4, is again quite similar to those described above. One essential and important distinction is that in FIG. 4 three-phase A.C. power is converted to a high voltage D.C. potential across load L. In FIG. 4 the 120° out-of-phase output of a three-phase power supply is connected to terminals T1, T2, and T3. A three-phase power supply which may be employed to energize terminals T1–T3 is illustrated in FIG. 9 of my copending application Ser. No. 177,660, filed Mar. 5, 1962. The FIG. 4 apparatus is illustrated as including three rectifying modules MX, MY and MZ, each including six metallic or junction-type diodes DX1–DX6; DY1–DY6 and DZ1–DZ6; and three inductors LX1–LX3; LY1–LY3 and LZ1–LZ3. The A.C. input terminals of module MX are indicated at TX1, TX2 and TX3 and the D.C. output terminals thereof, at TX4 and TX5. Similarly, the A.C. input terminals of module MY are shown at TY1–TY3 and of module MZ at TZ1–TZ3; while the output terminals of MY and MZ are indicated at TY4, TY5 and TZ4, TZ5, respectively. Coupling capacitors CX1–CX3; CY1–CY3 and CZ1–CZ3 couple A.C. power from terminals T1–T3, respectively, to the modules. The interelectrode capacitances of the respective metallic diodes are indicated at XX1–XX6; XY1–XY6 and XZ1–XZ6. It will be understood that although only three rectifying modules are shown in FIG. 4, any number may be provided to provide the desired output voltage across load L. Also, it will be understood that the sizes of inductors LX1, LX2, etc. are chosen to provide parallel tank circuits (resonant at the frequency of the three-phase source) between the A.C. input terminals of each of the modules, and thereby maximize the A.C. impedance characteristics between each pair of input terminals. As explained above, this increases the overall efficiency of the operation by limiting the current through the various coupling capacitors. Further, it will be understood that the above described parametrical relationship between the impedances of CX1–3 etc. and XX1–3 will be maintained so the former will always be not greater than about ⅕ to 1/10 that of the latter.

Operation of the embodiment of FIG. 4 is again similar to that described above, except that rectification of the 120° out-of-phase voltages applied to terminals T1, T2 and T3 is accomplished by a three-phase bridge. Thus, the three-phase power coupled to module MX, for example, is rectified by the three-phase bridge thereof and converted to a D.C. potential across terminals TX4 and TX5. Again, because the diodes of each module form a balanced circuit, current coupled across any of the diodes in a reverse direction at any instant is compensated for or bucked out by current coupled across the other diodes of the module in a forward direction. As a result, there is no A.C. component at the outputs of the respective modules and therefore no A.C. potential developed across load L.

In view of the above, it is seen that the FIG. 4 apparatus possesses the substantial advantages of the FIGS. 2 and 3 apparatus outlined above. Moreover, the use of a three-phase configuration provides a more efficient use of rectifiers wherein smaller rating rectifiers may be utilized. It will be noted that the inductors LX1–3, LY1–3 and LZ1–3 may be connected in a Y configuration instead af a delta configuration as shown.

In each of the systems of FIGS. 2–4 it is preferred that shielding rings be employed to avoid radiation. These could include, for example, conductive rings surrounding each of the various modules with each ring connected to the D.C. output terminal of a respective module. Since this shielding forms no part of the present invention, these rings have not been shown on the drawings in the interest of clarity.

In view of the above, it will be seen that the several objects of the invention are achieved and other advantages attained.

As various changes could be made in the above constructions and circuits without departing from the scope of the invention, it is intended that all matter contained in the above description or shown in the accompanying drawings shall be interpreted as illustrative and not in a limiting sense.

What is claimed is:

Voltage multiplication apparatus comprising a plurality of rectifying modules each having positive and negative D.C. output terminals and three A.C. input terminals, the output terminals of said modules being connected in series between a pair of high voltage D.C. terminals and adapted to develop a high voltage D.C. potential across a D.C. load impedance connected across said high voltage terminals, a three-phase A.C. power source, three coupling capacitors connected between said source and the A.C. input terminals of one of said modules for coupling three-phase power from said source to said one module, three coupling capacitors connected between the A.C. input terminals of each of said modules and a succeeding module for coupling three-phase power from each module to a succeeding module, each of said modules comprising six metallic rectifying diodes having a reverse impedance at the operating frequency of said A.C. source not substantially greater than the impedance of said load, said six metallic diodes in each module being interconnceted to form a three-phase rectifying bridge circuit wherein current coupled across any one of said diodes in a reverse direction at any instant is compensated for by current coupled across at least one other diode of said module in a forward direction whereby each of said modules converts the three-phase power coupled thereto to a D.C. potential across its respective positive and negative D.C. output terminals, each module further including three inductors interconnected between said A.C. input terminals whereby each of said modules exhibits between any two of said A.C. input terminals the A.C. impedance characteristics of a tuned parallel LC circuit resonant at the operating frequency of said A.C. power source.

References Cited by the Examiner

UNITED STATES PATENTS 3,036,259 5/1962 Heilpern ------------ 321—15

JOHN F. COUCH, *Primary Examiner.*

M. L. WACHTELL, *Assistant Examiner.*